(12) United States Patent
Koga et al.

(10) Patent No.: US 7,973,638 B2
(45) Date of Patent: Jul. 5, 2011

(54) VOLTAGE NON-LINEAR RESISTOR CERAMIC COMPOSITION AND MULTILAYER VARISTOR USING THE SAME

(75) Inventors: Eiichi Koga, Hokkaido (JP); Noriko Sawada, Hokkaido (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 12/401,920

(22) Filed: Mar. 11, 2009

(65) Prior Publication Data
US 2009/0231084 A1   Sep. 17, 2009

(30) Foreign Application Priority Data

| Mar. 14, 2008 | (JP) | 2008-065394 |
| Apr. 16, 2008 | (JP) | 2008-106504 |
| Apr. 23, 2008 | (JP) | 2008-112351 |
| Dec. 8, 2008 | (JP) | 2008-311904 |
| Dec. 8, 2008 | (JP) | 2008-311905 |
| Dec. 8, 2008 | (JP) | 2008-311906 |

(51) Int. Cl.
*H01C 7/10*  (2006.01)

(52) U.S. Cl. ............... 338/21; 338/307; 338/309
(58) Field of Classification Search ......... 338/20–21, 338/22 R, 307–309
See application file for complete search history.

(56) References Cited

U.S. PATENT DOCUMENTS

| 5,208,727 A | * | 5/1993 | Okamoto et al. | 361/321.4 |
| 5,720,859 A | * | 2/1998 | Czubarow et al. | 204/157.43 |
| 6,554,609 B2 | * | 4/2003 | Yadav et al. | 432/9 |
| 6,839,273 B2 | * | 1/2005 | Odagawa et al. | 365/171 |
| 2004/0155750 A1 | * | 8/2004 | Nakamura | 338/21 |

FOREIGN PATENT DOCUMENTS

| JP | 2007-005500 A | 1/2007 |
| WO | 2004/038738 A1 | 5/2004 |

* cited by examiner

*Primary Examiner* — Kyung Lee
(74) *Attorney, Agent, or Firm* — Pearne & Gordon LLP

(57) ABSTRACT

A voltage non-linear resistor ceramic composition has ZnO as a main component and is represented by the general formula $(1-x)ZnO+x[Sr_{1-y}M_y]_{1-a}[Co_{1-z}A_z]_{1+a}O_3$. Here, M is at least one of Ca and Ba, and A is Mn or Cr. x, y, z and a indicate molar ratios, and $0.0005 \leq x \leq 0.10$, $0 \leq y \leq 0.8$, $0 \leq z \leq 0.8$, and $-0.1 \leq a \leq 0.2$ are satisfied.

12 Claims, 1 Drawing Sheet

FIG.1

VOLTAGE NON-LINEAR RESISTOR CERAMIC COMPOSITION AND MULTILAYER VARISTOR USING THE SAME

BACKGROUND OF THE INVENTION

1. Field of the Invention

The present invention relates to a voltage non-linear resistor ceramic composition used for a varistor appropriate for protecting electronics from electrostatic discharge, as well as to a multilayer varistor using the same.

2. Description of the Related Art

Semiconductor devices, such as integrated circuit devices (ICs) used in electronics, may be damaged by electrostatic discharge (ESD) or the properties thereof may be deteriorated. Damage of semiconductor devices due to ESD causes significant problems in electronics, such as malfunctioning and failure. In particular, recent semiconductor devices are more easily affected by ESD, as the speed of the operation is higher. Therefore, ESD protection have been becoming more and more important in recent years for various types of electronics. As electronic parts used for this, ZnO-based varistors made of a voltage non-linear resistor are widely in use.

It is desirable for varistors used as ESD protection to have excellent properties of ESD-suppression. In addition, varistors must not be destroyed by ESD, and thus, it is necessary for them to have excellent reliability performance against ESD. Furthermore, compact varistors having a capacitance of as low as several pF which do not cause the transmission properties to deteriorate and can be used when the frequency of the circuit signal is high have been desired, because recently miniaturization of electronics is strongly desired.

However, conventional multilayer varistors do not sufficiently meet the above-described requirements in terms of their properties. ZnO-based varistors are generally categorized into two types: Pr-based ones and Bi-based ones, on the basis of the additives for gaining certain properties. Among these, Pr-based multilayer varistors are appropriate for lowering the varistor voltage. Some of them have excellent properties of ESD-suppression and the reliability performance against ESD as well as a low varistor voltage $V_{1\ mA}$ (voltage value when current value is 1 mA) of approximately 8 V to 39 V. However, the dielectric constant thereof is generally approximately 700. Therefore, the space between electrodes is small in multilayer varistors having a low varistor voltage $V_{1\ mA}$ of approximately 8 V to 39 V, and thus, the increase in the capacitance becomes significant, and it is difficult to lower the capacitance. Accordingly, such varistors are inappropriate for application in lines for high-frequency signals.

On the other hand, Bi-based multilayer varistors have excellent non-linearity in the voltage. In addition, some of them have a low dielectric constant of approximately 70. That is, there are multilayer varistors having a very small capacitance value of 0.5 pF to 1 pF. When the area of the electrodes is reduced together with the reduction in capacitance, the current density increases, and therefore, the properties may easily be deteriorated due to ESD when the varistor voltage is lowered to 100 V or less. Therefore, only a high varistor voltage of approximately 100 V can be implemented when designing to gain sufficient reliability performance against ESD for practical use, and thus, it is difficult to lower the varistor voltage. Therefore, the properties of ESD-suppression tend to be insufficient, and the ESD protection in the device tend to be insufficient.

SUMMARY OF THE INVENTION

The present invention provides a multilayer varistor where the varistor voltage is low and the capacitance is small, and which has excellent reliability performance against ESD and is appropriate for use in a high-frequency transmission circuit. The present invention also provides a voltage non-linear resistor ceramic composition that is appropriate for manufacturing such a multilayer varistor.

The voltage non-linear resistor ceramic composition according to the present invention has ZnO as a main component. In addition, a perovskite component that is represented by $[Sr_{1-y}M_y]_{1-a}[Co_{1-z}A_z]_{1+a}O_3$ is contained. More specifically, when the composition is represented by the general formula $(1-x)ZnO+x[Sr_{1-y}M_y]_{1-a}[Co_{1-z}A_z]_{1+a}O_3$, M is at least one of Ca and Ba, A is Mn or Cr, and x, y, z and a indicate molar ratios: $0.0005 \leq x \leq 0.10$, $0 \leq y \leq 0.8$, $0 \leq z \leq 0.8$, and $-0.1 \leq a \leq 0.2$ are satisfied. The multilayer varistor according to the present invention has a ceramic sintered body having a number of inner layer electrodes inside, and external electrodes that are electrically connected to the inner layer electrodes and formed on the surface of the ceramic sintered body. The ceramic sintered body is formed using the above-described voltage non-linear resistor ceramic composition.

The voltage non-linear resistor ceramic composition according to the present invention can achieve a very low varistor voltage, excellent non-linearity, and an extremely low dielectric constant, in terms of its electrical properties. In addition, it has ZnO crystal grains in a microscopic structure. As a result of these properties, it has excellent electrical properties and excellent reliability performance against ESD as a voltage non-linear resistor. Therefore, it provides high reliability. The multilayer varistor according to the present invention is compact, and has a low varistor voltage and a small capacitance. In addition, it has excellent reliability performance against ESD. Therefore, it is appropriate for use in high-frequency transmission circuits.

DETAILED DESCRIPTION OF THE INVENTION

First Embodiment

A voltage non-linear resistor ceramic composition according to a first embodiment of the present invention has ZnO as a main component and contains a perovskite component represented by $[Sr_{1-y}M_y]_{1-a}Co_{1+a}O_3$. M is at least one of Ca and Ba, and x, y, and a indicate molar ratios: $0.0005 \leq x \leq 0.10$, $0 \leq y \leq 0.8$, and $-0.1 \leq a \leq 0.2$ are satisfied. That is, the voltage non-linear resistor ceramic composition according to the present embodiment is a composition that can be represented by the general formula $(1-x)ZnO+x[Sr_{1-y}M_y]_{1-a}[Co_{1-z}A_z]_{1+a}O_3$.

In the following, the voltage non-linear resistor ceramic composition according to the present embodiment is described in detail on the basis of specific examples. First, as starting materials, highly chemically pure powders of ZnO, which is a main component, $SrCO_3$, $Co_2O_3$, $CaCO_3$, and $BaCO_3$, which are sub-components, and $Al_2O_3$, which is a second sub-component, are prepared. Next, the starting materials are weighed, and the values x, y, and a in the general formula $(1-x)ZnO+x[Sr_{1-y}M_y]_{1-a}Co_{1+a}O_3$ indicate the composition ratio for Samples Nos. 1 to 52 in Table 1 when calculated for atoms, and the rest becomes ZnO in the composition after sintering. In addition, $Al_2O_3$, which is a second sub-component, is added to some of the samples at a certain ratio relative to 1 mol of the above-described composition in the general formula, so that the composition ratio for Samples Nos. 47 to 52 in Table 1 can be gained when weighed. In the following description, Sample No. 1 in Table 1 is referred to as Sample No. 1-1. This is the same for Samples No. 2 to 52.

Powders of these starting materials are put into a bowl mill made of polyethylene, balls made of stabilized zirconia and pure water are added, and the whole is mixed for approximately 20 hours, and then dehydrated and dried. The dried powder is put into a crucible made of highly pure alumina and temporarily baked for two hours at approximately 750° C. Next, the temporarily baked powder is put into the same bowl mill as used at the time of mixing, and balls of stabilized zirconia and pure water are added, and the temporarily baked powder is crushed for approximately 20 hours, and then dehydrated and dried.

Next, an organic binder is added to this dried material powder and the whole is mixed uniformly and granulated through a sieve with a 32 mesh. After that, a die assembly and a hydraulic press are used for molding under pressure for molding of 2 tons/cm$^2$, and thus, a molded body having a diameter of 13 mm and a thickness of 1.3 mm is fabricated. Next, a Pd-based electrode paste is printed on the upper and lower surfaces of this molded body and dried, so that electrodes are formed. Furthermore, this molded body is put into a sheath made of heat resistant zirconia and sintered for two hours in the air at a sintering temperature of 1000° C. to 1100° C. Thus, voltage non-linear resistors having the composition shown for Samples Nos. 1-1 to 1-52 are fabricated.

Next, the electrical properties of the respective voltage non-linear resistors of Samples Nos. 1-1 to 1-52 are described on the basis of the results of evaluation of the varistor properties and the dielectric constant. The voltage-current properties are evaluated as the varistor properties through measurement of the voltage value when a current in a range from 1 μA to 1 mA flows through the sample, and the varistor voltage $V_{1\,mA}$/mm (V) per unit thickness and the non-linearity α are found from the voltage-current properties. The varistor voltage $V_{1\,mA}$ is the voltage value when the current value is 1 mA. Thus, the varistor voltage $V_{1\,mA}$/mm (V) per unit thickness is found from the thickness of the sample. In addition, the ratio $V_{1\,mA}/V_{10\,\mu A}$, which is the ratio of the voltage value $V_{1\,mA}$ when the current value is 1 mA to the voltage value $V_{10\,\mu A}$ when the current value is 10 μA, is found as the non-linearity α. Accordingly, the closer to 1 the non-linearity α is, the more ideal the properties are, and the more non-linear.

Meanwhile, the capacitance is measured when the measured frequency is 1 MHz, the measured voltage is 1 Vrms, and there is no DC bias, and the dielectric constant $\epsilon_r$ is found from the capacitance, the thickness, and the diameter of the element of the sample. In addition, the average crystal grain diameter $D_g$ of the ZnO grains is found from an image taken through an electron microscope in accordance with an interception method, and thus, the microscopic structure of the crystal of the sample is evaluated.

The results of evaluation for the voltage non-linear resistors of Samples Nos. 1-1 to 1-52 are shown in Table 1, together with the composition.

TABLE 1

| | Composition of sample | | | | | Electrical properties | | | Microscopic structure |
|---|---|---|---|---|---|---|---|---|---|
| | Composition ratio | | | | Second sub-component | Varistor voltage | | Dielectric | Crystal grain diameter |
| Sample No. | x mol | Y mol | a mol | M mol | $Al_2O_3$ mol | $V_{1\,mA}$/mm (V) | Non-linearity α ($V_{1\,mA}/V_{10\,\mu A}$) | constant $\epsilon_r$ | $D_g$ (μm) μm |
| *1 | 0 | 0 | 0 | None | None | 0.01 | — | — | 1.8 |
| *2 | 0.0002 | 0 | 0 | ↑ | ↑ | 200 | 3.57 | 48 | 1.8 |
| 3 | 0.0005 | 0 | 0 | ↑ | ↑ | 260 | 1.75 | 35 | 1.6 |
| 4 | 0.005 | 0 | 0 | ↑ | ↑ | 300 | 1.25 | 28 | 1.4 |
| *5 | 0.01 | 0 | −0.2 | ↑ | ↑ | 512 | 1.51 | 31 | 2.7 |
| 6 | 0.01 | 0 | −0.1 | ↑ | ↑ | 408 | 1.23 | 25 | 1.9 |
| 7 | 0.01 | 0 | 0 | ↑ | ↑ | 390 | 1.11 | 22 | 1.7 |
| 8 | 0.01 | 0 | 0.1 | ↑ | ↑ | 360 | 1.11 | 22 | 1.7 |
| 9 | 0.01 | 0 | 0.2 | ↑ | ↑ | 368 | 1.13 | 24 | 1.6 |
| *10 | 0.01 | 0 | 0.3 | ↑ | ↑ | 501 | 1.19 | 26 | 2.2 |
| 11 | 0.03 | 0 | 0 | ↑ | ↑ | 420 | 1.11 | 23 | 1.5 |
| 12 | 0.05 | 0 | 0 | ↑ | ↑ | 460 | 1.09 | 23 | 1.7 |
| 13 | 0.07 | 0 | 0 | ↑ | ↑ | 480 | 1.12 | 25 | 1.6 |
| 14 | 0.09 | 0 | 0 | ↑ | ↑ | 490 | 1.25 | 30 | 1.7 |
| 15 | 0.10 | 0 | 0 | ↑ | ↑ | 495 | 1.33 | 32 | 1.9 |
| *16 | 0.11 | 0 | 0 | ↑ | ↑ | 510 | 2.65 | 56 | 6.6 |
| *17 | 0.15 | 0 | 0 | ↑ | ↑ | 730 | 3.12 | 65 | 7.2 |
| 18 | 0.02 | 0 | 0 | ↑ | ↑ | 410 | 1.12 | 23 | 1.6 |
| 19 | ↑ | 0.2 | 0 | Ca | ↑ | 405 | 1.12 | 22 | 1.4 |
| 20 | ↑ | 0.4 | 0 | ↑ | ↑ | 390 | 1.11 | 24 | 1.3 |
| *21 | ↑ | 0.6 | −0.2 | ↑ | ↑ | 506 | 1.48 | 43 | 2.6 |
| 22 | ↑ | ↑ | −0.1 | ↑ | ↑ | 428 | 1.30 | 36 | 1.5 |
| 23 | ↑ | ↑ | 0 | ↑ | ↑ | 390 | 1.14 | 32 | 1.2 |
| 24 | ↑ | ↑ | 0.1 | ↑ | ↑ | 364 | 1.13 | 32 | 1.2 |
| 25 | ↑ | ↑ | 0.2 | ↑ | ↑ | 370 | 1.12 | 34 | 1.2 |
| *26 | ↑ | ↑ | 0.3 | ↑ | ↑ | 506 | 1.22 | 37 | 2.0 |
| 27 | ↑ | 0.8 | 0 | ↑ | ↑ | 395 | 1.15 | 43 | 1.1 |
| *28 | ↑ | 1.0 | 0 | ↑ | ↑ | 430 | 1.16 | 106 | 1.6 |
| 29 | 0.04 | 0 | 0 | None | ↑ | 425 | 1.13 | 23 | 1.8 |
| 30 | ↑ | 0.2 | 0 | Ba | ↑ | 386 | 1.11 | 28 | 1.7 |
| *31 | ↑ | 0.4 | −0.2 | ↑ | ↑ | 501 | 1.57 | 41 | 2.5 |
| 32 | ↑ | ↑ | −0.1 | ↑ | ↑ | 402 | 1.28 | 35 | 1.8 |

TABLE 1-continued

| | Composition of sample | | | | | Electrical properties | | | Microscopic structure |
|---|---|---|---|---|---|---|---|---|---|
| | Composition ratio | | | | Second sub-component | Varistor voltage | Non-linearity | Dielectric constant | Crystal grain diameter |
| Sample No. | x mol | y mol | a mol | M mol | $Al_2O_3$ mol | $V_{1\,mA}$/mm (V) | $\alpha$ ($V_{1\,mA}/V_{10\,\mu A}$) | $\epsilon_r$ | $D_g$ (μm) μm |
| 33 | ↑ | ↑ | 0 | ↑ | ↑ | 380 | 1.10 | 31 | 1.6 |
| 34 | ↑ | ↑ | 0.1 | ↑ | ↑ | 352 | 1.09 | 30 | 1.6 |
| 35 | ↑ | ↑ | 0.2 | ↑ | ↑ | 360 | 1.11 | 33 | 1.6 |
| *36 | ↑ | ↑ | 0.3 | ↑ | ↑ | 501 | 1.18 | 35 | 2.1 |
| 37 | ↑ | 0.6 | 0 | ↑ | ↑ | 372 | 1.11 | 42 | 1.7 |
| 38 | ↑ | 0.8 | 0 | ↑ | ↑ | 366 | 1.14 | 49 | 1.9 |
| *39 | ↑ | 1.0 | 0 | ↑ | ↑ | 350 | 1.32 | 118 | 5.2 |
| 40 | 0.03 | 0.5 | 0 | Ca | ↑ | 412 | 1.09 | 23 | 1.1 |
| 41 | ↑ | ↑ | 0 | 0.8Ca + 0.2Ba | ↑ | 401 | 1.08 | 24 | 1.1 |
| 42 | ↑ | ↑ | 0 | 0.6Ca + 0.4Ba | ↑ | 392 | 1.08 | 30 | 1.2 |
| 43 | ↑ | ↑ | 0 | 0.4Ca + 0.6Ba | ↑ | 390 | 1.09 | 41 | 1.4 |
| 44 | ↑ | ↑ | 0 | 0.2Ca + 0.8Ba | ↑ | 376 | 1.10 | 47 | 1.6 |
| 45 | ↑ | ↑ | 0 | Ba | ↑ | 362 | 1.11 | 49 | 1.8 |
| 46 | 0.04 | 0.6 | 0 | Ca | ↑ | 345 | 1.12 | 27 | 1.3 |
| 47 | ↑ | ↑ | 0 | ↑ | 0.0001 | 340 | 1.11 | 26 | 1.2 |
| 48 | ↑ | ↑ | 0 | ↑ | 0.0003 | 340 | 1.10 | 28 | 1.0 |
| 49 | ↑ | ↑ | 0 | ↑ | 0.001 | 336 | 1.10 | 30 | 0.95 |
| 50 | ↑ | ↑ | 0 | ↑ | 0.003 | 310 | 1.11 | 42 | 0.92 |
| 51 | ↑ | ↑ | 0 | ↑ | 0.005 | 320 | 1.10 | 143 | 0.95 |
| 52 | ↑ | ↑ | 0 | ↑ | 0.01 | 360 | 1.12 | 180 | 0.90 |

Samples with * are comparative examples and outside the scope of the present invention.

In the following, the reason why the range of the composition in the voltage non-linear resistor ceramic composition according to the present embodiment is limited is described with reference to Table 1.

In the case where the molar ratio x of $[Sr_{1-y}M_y]_{1-a}Co_{1+a}O_3$ is less than 0.0002 mol as in Sample No. 1-1, the varistor properties are not provided. The varistor properties are provided when x is 0.0002 mol or more, as in Sample No. 1-2. However, the difference in the properties between grains and grain boundaries is great with this amount, and in terms of the properties of the element as a whole, the non-linearity α is particularly low, thus the element is not practical. In order for the non-linearity α, which makes the element practical, where the properties are uniform between grains, to be 2.0 or less, it is necessary for x to be 0.0005 mol or more as in Samples Nos. 1-3 to 1-15.

Meanwhile, x is more than 0.10 mol in Samples Nos. 1-16 and 1-17. In those cases, a phase is formed through excessive deposition in the interface between ZnO grains as a secondary phase, the phase makes the varistor voltage high ($V_{1\,mA}$/mm>500 V), the non-linearity low (α>2.0), and the dielectric constant large ($\epsilon_r$>50). Change in these properties leads to deterioration of the properties of ESD-suppression and the quality of transmission in signal lines, and therefore, the element is not practical, which is not preferable.

In addition, in the case where the molar ratio a of $[Sr_{1-y}M_y]_{1-a}Co_{1+a}O_3$ is smaller than −0.1 mol as in Samples Nos. 1-5, 1-21, and 1-31, the varistor voltage becomes high ($V_{1\,mA}$/mm>500 V), and the average crystal grain diameter $D_g$ increases, and therefore, the element is not practical, which is not preferable. In addition, this is the same in the case where the molar ratio a is greater than 0.2 mol as in Samples Nos. 1-10, 1-26, and 1-36.

Accordingly, it is preferable for components that are appropriate for voltage non-linearity resistors for high frequency transmission to be components where $V_{1\,mA}$/mm is as low as 500V or less, α is 2.0 or less and, $\epsilon_r$ is 50 or less. That is, when the composition has ZnO as a main component and is represented by the general formula $(1-x)ZnO+x[Sr_{1-y}M_y]_{1-a}Co_{1+a}O_3$, a composition range where x is 0.0005 mol or more and 0.10 or less and a is −0.1 mol or more and 0.2 mol or less is preferable.

In addition, in Samples Nos. 1-8, 1-9, 1-24, 1-25, 1-34, and 1-35, the molar ratio a in $[Sr_{1-y}M_y]_{1-a}Co_{1+a}O_3$ is in a range of 0<a≦0.2, and Co in the B site is excessive in comparison with $[Sr_{1-y}M_y]$ in the A site in the composition. In voltage non-linear resistors having such a composition, the varistor voltage can further be lowered while maintaining a low dielectric constant and excellent non-linearity. The reduction in the varistor voltage leads to further improvement in the effects of ESD-suppression.

In addition, Samples Nos. 1-19, 1-20, 1-23, 1-27, 1-30, 1-33, 1-37, 1-38, and 1-40 to 1-45 have a composition where part of the Sr in the A site of $[Sr_{1-y}M_y]_{1-a}Co_{1+a}O_3$ is substituted with at least one of Ca and Ba. In voltage non-linear resistors having such a composition, the varistor voltage can be further lowered while maintaining a low dielectric constant and excellent non-linearity. Such reduction in the varistor voltage leads to further improvement of the effects of ESD-suppression.

However, in the case where the molar ratio y of the substituted element is more than 0.8 as in Samples Nos. 1-28 and 1-39, the dielectric constant increases, irrespectively of whether the element is Ba or Ca. Therefore, it is preferable for the molar ratio y of the substituted element to be 0.8 or less in the composition range, in order for $\epsilon_r$ to be as low as 50 or less.

In the case where the molar ratio y of the substituted element in the A site is 1.0 thus all of the Sr in the A site is completely substituted, the crystal grains tend to grow abnormally. Particularly in the case where Sr is completely substituted with Ba as in Sample No. 1-39, this tendency is significant. Therefore, the average crystal grain diameter $D_g$ is also great.

When ZnO grains grow abnormally, the microscopic structure becomes uneven. The microscopic structure is reflected in the difference in the density of current through grains and the interfaces between them. Therefore, in addition to the non-linearity, current density due to ESD is likely to concentrate locally in the interfaces between the coarse grains particularly, and this becomes a starting point leading to damage of the structure. Therefore, the microscopic structure becomes a secondary factor in negatively affecting the non-linearity and the reliability performance against ESD.

Meanwhile, in the case of compositions where the molar ratio y of the substituted element is 0.8 or less, ZnO grains do not grow abnormally, and the average crystal grain diameter $D_g$ is small and uniform, and thus, the non-linearity and reliability performance against ESD can be improved. Therefore, the reliability is higher. Specifically, it is preferable for $D_g$ to be 2.0 μm or less. $D_g$ is affected by the average grain diameter of the starting material powder of ZnO as a main component. Although Table 1 shows that the minimum value of $D_g$ is 0.09 μm of Sample No. 1-52, it may be as small as approximately 0.2 μm when using the starting material powder of ZnO having smaller average grain diameter.

For the above-described reasons, it is preferable for the composition of voltage non-linear resistors for high-frequency transmission to be a composition having such properties that $V_{1\,mA}$/mm is 500 V or less, α is 2.0 or less, and $\epsilon_r$ is 50 or less. In other words, a composition having a very low varistor voltage, excellent non-linearity, and an extremely low dielectric constant is preferable. That is, a composition where M is at least one of Ca and Ba, x is 0.0005 mol or more and 0.10 mol or less, the molar ratio y of M is 0.8 or less, and a is −0.1 mol or more and 0.2 mol or less is appropriate when the composition has ZnO as a main component and is represented by the general formula $(1-x)ZnO+x[Sr_{1-y}M_y]_{1-a}Co_{1+a}O_3$.

Furthermore, compositions to which an extremely small amount of $Al_2O_3$ is added as a second sub-component as in Samples Nos. 1-47 to 1-52 are more effective for further miniaturizing crystal grains and making grains uniform, as compared to Sample No. 1-46. Therefore, the non-linearity and reliability performance against ESD can further be improved, and thus, the reliability is higher. In addition, when the grains in the ceramic structure are microscopic and uniform, the mechanical strength is naturally high, and thus, the reliability against thermal impact and the mechanical impact when the device is dropped is high. However, in the case where a large amount is added as in Samples Nos. 1-51 and 1-52, the dielectric constant is high. Therefore, it is preferable for the amount of $Al_2O_3$ added per 1 mol of the main component to exceed 0 mol and be not more than 0.003 mol in terms of the composition range, in order for $\epsilon_r$ to be 50 or less.

When the above-described voltage non-linear resistor ceramic composition is analyzed through component analysis and X-ray diffraction, it can be found that the composition has a solid solution phase of $[Sr_{1-y}M_y]_{1-a}Co_{1+a}O_3$ with a perovskite structure in the grain boundaries between ZnO grains, in addition to the crystal phase of ZnO. Thus, it can be confirmed that the perovskite type $[Sr_{1-y}M_y]_{1-a}Co_{1+a}O_3$ compound in grain boundaries between ZnO grains works as a substance having varistor properties. Accordingly, ZnO to which a perovskite type $[Sr_{1-y}M_y]_{1-a}Co_{1+a}O_3$ compound that is synthesized in advance is added has the same properties. As is clear from the above, ZnO containing a perovskite type $[Sr_{1-y}M_y]_{1-a}Co_{1+a}O_3$ compound in the above-described composition range has the above-described excellent properties.

As described above, the voltage non-linear resistor ceramic composition according to the present embodiment has ZnO as a main component. In addition, it contains $[Sr_{1-y}M_y]_{1-a}Co_{1+a}O_3$, where M is at least one of Ca and Ba. $[Sr_{1-y}M_y]_{1-a}Co_{1+a}O_3$ allows an acceptor level to be provided in the interfaces between ZnO grains of an N type semiconductor and becomes the origin to provide the N type semiconductor with properties of interfacial barrier (varistor properties) in a polycrystal structure. In this respect, it functions in the same manner as conventional Bi oxides and Pr oxides. However, the height of the barrier $V_{gh}$ per grain boundary as found from the varistor voltage $V_{1\,mA}$/mm and the average crystal diameter $D_g$ of the sample according to the present embodiment is 0.4 eV to 0.6 eV. That is, material properties having a low value can be gained in comparison with conventional compositions, which generally have 0.6 eV to 1.0 eV (Pr-based compositions) or 0.8 eV to 1.4 eV (Bi-based compositions). The varistor voltage is a product of the number N of grain boundaries and $V_{gh}$ in the design of varistor products as an electronic part for ESD protection. Accordingly, $V_{gh}$ means that it is essentially advantageous to lower the voltage.

In addition, the Bi oxide in the Bi-based varistor has such properties that the state changes in various ways (conversion to liquid phase or phase transition) at temperatures of approximately 600° C. or higher. This leads to changes in the properties and thermal destruction due to the thermal energy generated as a result of ESD and causes the properties of the element to deteriorate. In contrast, the melting point of $[Sr_{1-y}M_y]_{1-a}Co_{1+a}O_3$, where M is at least one of Ca and Ba, is 1500° C. or higher, and the composition according to the present embodiment is thermally stable. Therefore, the perovskite type oxide can be used as a substance having voltage non-linear resistor properties, and thus, a voltage non-linear resistor having excellent reliability performance against ESD can be obtained.

In addition, the component elements of the perovskite type oxide are lighter than Pr, and therefore, the dielectric constant of the crystal is generally lower. Therefore, in the case where the depletion layer region in the grain boundaries is the same, the dielectric constant is essentially lower. Accordingly, in the case where the perovskite type oxide is used so that the properties become desirable, the dielectric constant is low in grain boundaries, and therefore, it is possible that the capacitance in the voltage non-linear resistor element is smaller. As described above, it is preferable that the voltage non-linear resistor ceramic composition is free from Bi and Pr.

Figure 1:
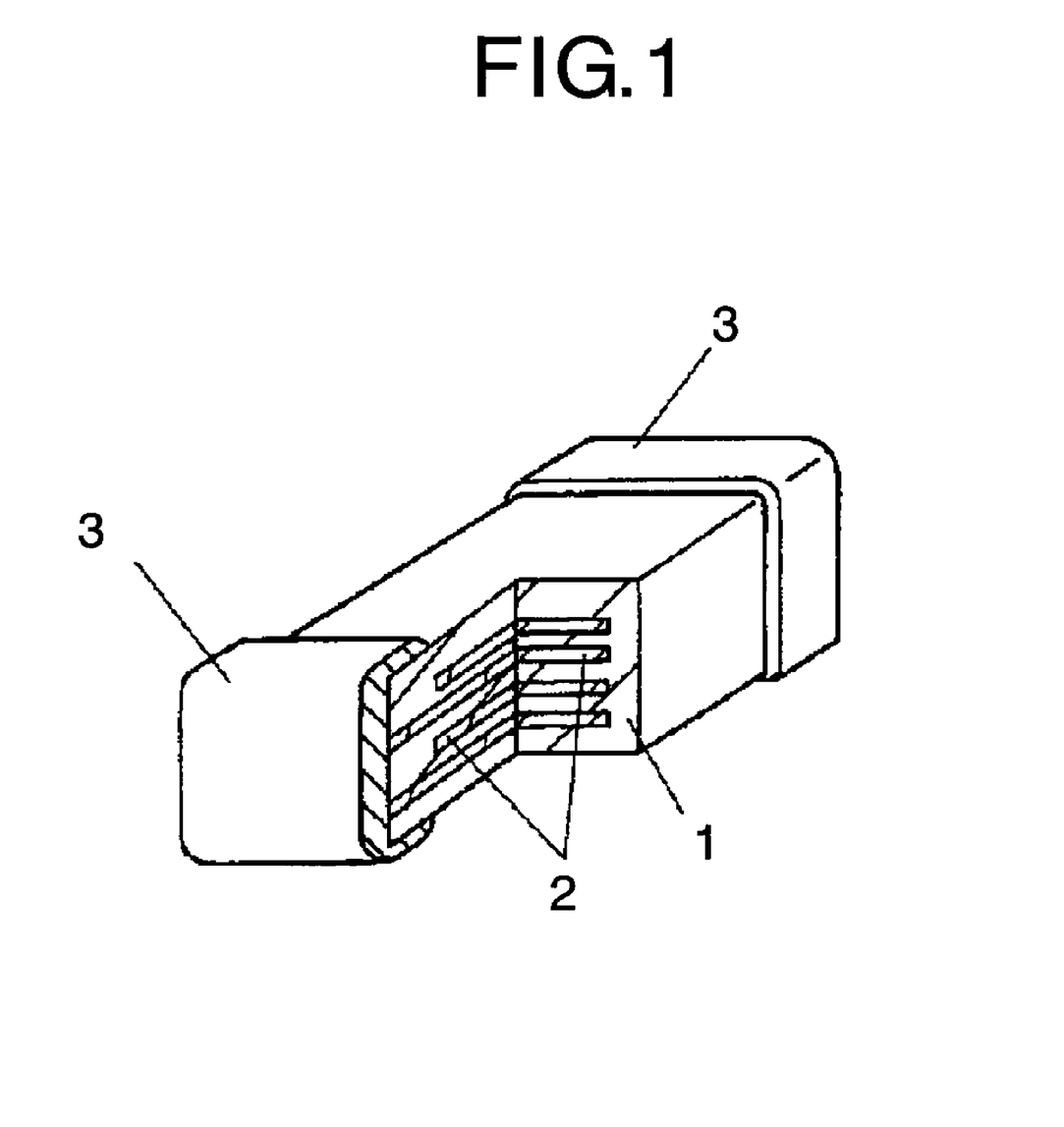
FIG. 1 is a perspective view of a multilayer varistor according to an embodiment of the present invention with a portion cut out.

Next, the properties of a multilayer varistor fabricated using the above-described voltage non-linear resistor ceramic composition are described in detail. FIG. 1 is a perspective view showing a multilayer varistor according to the present embodiment with a portion cut out. This multilayer varistor has ceramic sintered body 1, a plurality of inner layer electrodes 2, and a pair of external electrodes 3. Inner layer electrodes 2 are formed inside ceramic sintered body 1. Outer electrodes 3 are formed on the surface of ceramic sintered body 1 and electrically connected to inner layer electrodes 2. Ceramic sintered body 1 is formed of the above-described voltage non-linear resistor ceramic composition.

First, fifteen compositions of Samples Nos. 1-2, 1-7, 1-8, 1-11, 1-15, 1-16, 1-19, 1-23, 1-24, 1-33, 1-34, 1-39, 1-43, 1-46, and 1-49 are selected from Table 1 as voltage non-linear resistor ceramic compositions for fabricating multilayer varistors. As starting materials, highly chemically pure powders of ZnO, which is a main component, $SrCO_3$, $Co_2O_3$, $CaCO_3$, and $BaCO_3$, which are sub-components, and $Al_2O_3$, which is a second sub-component, are prepared. These powders are used, and the starting materials are weighed, so that the composition ratios correspond to the above-described sample numbers. Next, in accordance with the same method as above, the starting materials are mixed, dried, temporarily baked, crushed, and dried, so that fifteen types of material powders having composition ratios of the respective sample numbers are prepared.

Next, these material powders are each used, and fifteen types of multilayer varistors are fabricated in accordance with the following method. First, an organic binder, a solvent, and a plasticizing agent are added to each material powder, and the whole is mixed, and then molded in accordance with a doctor blade method, so that a green sheet is fabricated. Then, a conductive layer to become inner layer electrode 2 is formed on the top of this green sheet in accordance with a screen printing method, using a paste of an AgPd alloy (Ag:Pd=70:30). The green sheets on which conductive layers are formed as described above are stacked on the top of each other, and pressure is applied, so that a multilayer block is fabricated. Then, the multilayer block is cut and separated into pieces of a predetermined size, and thus, individual raw chips are fabricated. These raw chips are heated to approximately 500° C. in the air so as to remove the binder, and after that, the chips are heated to 1000° C. to 1100° C. in the air so as to be sintered, and thus, a sintered element where inner layer electrodes 2 are formed inside ceramic sintered body 1 is fabricated. One green sheet becomes one varistor layer.

The sintered body element is polished with a barrel, so that inner layer electrodes 2 are exposed from the two end surfaces of the sintered body element. After that, an Ag paste is applied to the two end surfaces of the sintered body element and baked at 750° C. to 850° C., and then plated with Ni—Sn. Thus, external electrodes 3 are formed and the multilayer varistor according to the present embodiment is completed. The size of the fabricated multilayer varistor is 1.0 mm in the longitudinal direction, 0.5 mm in the width direction, and 0.5 mm in the thickness direction. In addition, the thickness of the varistor layer is approximately 70 μm and there are two layers, and the area per layer is approximately 0.06 mm$^2$.

The electrical properties are evaluated for these fifteen types of multilayer varistors. In terms of the electrical properties, $V_{1\,mA}$ is evaluated as the varistor voltage, the voltage ratio $V_{1\,mA}/V_{10\,\mu A}$ is evaluated as an index of the non-linearity α, and the capacitance is evaluated. In addition, the reliability performance against ESD is evaluated. The reliability performance against ESD is evaluated from the change in properties before and after applying an ESD voltage of 8 kV in accordance with IEC 61000-1-4 (charge capacitance: 150 pF, discharge resistance: 330Ω) using an electrostatic discharge simulator. In addition, the change rate $\Delta V_{1\,mA}$ from the initial value of the varistor voltage after the application of the ESD voltage can be found from the results of evaluation of the reliability performance against ESD. The results of evaluation of the electrical properties of the multilayer varistor according to the present embodiment are shown in Table 2, together with the sample numbers of the used compositions. In the following description, Sample No. 101 in Table 2 is referred to as Sample No. 1-101. This is the same for Samples No. 102 to 115.

TABLE 2

| | | Electrical properties | | | |
|---|---|---|---|---|---|
| Sample No. | Composition | Varistor voltage $V_{1\,mA}$ (V) | Non-linearity α ($V_{1\,mA}/V_{10\,\mu A}$) | Capacitance (pF) | Reliability performance against ESD $\Delta V_{1\,mA}$ (%) |
| *101 | Sample No. 2 | 23.5 | 4.26 | 2.04 | −51.2 |
| 102 | Sample No. 7 | 35.7 | 1.12 | 0.63 | −16.5 |
| 103 | Sample No. 8 | 34.2 | 1.10 | 0.65 | −18.2 |
| 104 | Sample No. 11 | 39.9 | 1.11 | 0.64 | −18.9 |
| 105 | Sample No. 15 | 44.6 | 1.29 | 1.33 | −16.8 |
| *106 | Sample No. 16 | 48.6 | 2.96 | 1.45 | −62.3 |
| 107 | Sample No. 19 | 31.2 | 1.11 | 0.58 | −13.9 |
| 108 | Sample No. 23 | 30.2 | 1.16 | 0.75 | −12.5 |
| 109 | Sample No. 24 | 28.0 | 1.14 | 0.73 | −11.6 |
| 110 | Sample No. 33 | 29.4 | 1.08 | 0.98 | −20.1 |
| 111 | Sample No. 34 | 27.6 | 1.10 | 0.97 | −19.8 |
| *112 | Sample No. 39 | 28.6 | 1.10 | 3.06 | −64.8 |
| 113 | Sample No. 43 | 33.8 | 1.09 | 1.11 | −20.1 |
| 114 | Sample No. 46 | 28.6 | 1.13 | 0.55 | −21.2 |
| 115 | Sample No. 49 | 28.9 | 1.11 | 0.53 | −17.5 |

Samples with * are comparative examples and outside the scope of the present invention.

As is clear from Table 2, Sample No. 1-101 (composition of Sample No. 1-2) has low non-linearity, and the capacitance is large. In addition, Sample No. 1-106 (composition of Sample No. 1-16) has low non-linearity, and the varistor voltage is high. In addition, the capacitance of Sample No. 1-112 (composition of Sample No. 1-39) is as high as 3 pF or larger. Thus, none of these satisfies the requirements in terms of electrical properties for providing a varistor having excellent non-linearity, a low varistor voltage, and a low capacitance. As for the reliability performance against ESD, all of the samples have a change rate $\Delta V_{1\,mA}$ of as large as −50% or larger, which means that the properties are not appropriate for practical use.

Meanwhile, all of the multilayer varistors of Samples Nos. 1-102 to 1-105, Samples Nos. 1-107 to 1-111, and Samples Nos. 1-113 to 1-115 have a varistor voltage $V_{1\,mA}$ of 28 V to 45 V, a non-linearity α of 1.3 or less, and a capacitance of 0.5 pF to 1.3 pF. As described above, the electrical properties are well-balanced in comparison with the multilayer varistors of the above-described sample numbers, and thus, the electrical properties are excellent for varistors having a low varistor voltage and a small capacitance. In addition, all of the samples have a change rate $\Delta V_{1\,mA}$ of as little as approximately −21% or less and excellent reliability performance against ESD. The electrical properties are a low varistor voltage and a low capacitance value in the property region that cannot be obtained in conventional Pr-based and Bi-based compositions, in addition to excellent reliability performance against ESD. The excellent reliability performance against ESD can be obtained because the varistor layers have structures having excellent thermal stability in the grain boundaries, and in addition, a polycrystal body where the microscopic structure is uniform.

Second Embodiment

A voltage non-linear resistor ceramic composition according to a second embodiment of the present invention has ZnO as a main component and contains a perovskite component represented by $[Sr_{1-y}M_y]_{1-a}[Co_{1-z}Mn_z]_{1+a}O_3$. M is at least one of Ca and Ba, x, y, z, and a indicate molar ratios, and $0.0005 \leq x \leq 0.10$, $0 \leq y \leq 0.8$, $0 < z < 0.8$, and $-0.1 \leq a \leq 0.2$ are satisfied. That is, the voltage non-linear resistor ceramic composition according to the present embodiment is a composition that is represented by the general formula $(1-x)ZnO + x[Sr_{1-y}M_y]_{1-a}[Co_{1-z}Mn_z]_{1+a}O_3$. In other words, the voltage non-linear resistor ceramic composition according to the present embodiment contains a perovskite component where Co is partially substituted with Mn in the first embodiment.

In the following, specific examples of the voltage non-linear resistor ceramic composition according to the present embodiment are described in detail. First, as starting materials, highly chemically pure powders of ZnO, which is a main component, $SrCO_3$, $Co_2O_3$, $CaCO_3$, and $BaCO_3$, which are sub-components, and $Al_2O_3$, which is a second sub-component, are prepared. In addition, a highly pure powder of $MnO_2$ is also prepared. Then, a voltage non-linear resistor ceramic composition is fabricated through the same procedure as in the first embodiment except that the composition after sintering becomes the composition $(1-x)ZnO+x[Sr_{1-y}M_y]_{1-a}[Co_{1-z}Mn_z]_{1+a}O_3$ shown in Table 3. Table 3 also shows the results of evaluation of these electrical properties in the same manner as in the first embodiment. In the following description, Sample No. 1 in Table 3 is referred to as Sample No. 2-1. This is the same for Samples No. 2 to 58.

TABLE 3

| | Composition of sample | | | | | Second sub-component | Electrical properties | | | Microscopic structure |
|---|---|---|---|---|---|---|---|---|---|---|
| | Composition ratio | | | | | | Varistor voltage | Non-linearity | Dielectric Constant | Crystal grain diameter |
| Sample No. | x mol | y mol | z mol | a mol | M | $Al_2O_3$ mol | $V_{1mA}$/mm (V) | $\alpha$ ($V_{1mA}/V_{10\mu A}$) | $e_r$ | $D_g$ (μm) μm |
| *1 | 0 | 0 | 0.2 | 0 | None | None | 0.01 | — | — | 1.8 |
| *2 | 0.0002 | 0 | ↑ | 0 | ↑ | ↑ | 200 | 3.65 | 50 | 1.8 |
| 3 | 0.0005 | 0 | ↑ | 0 | ↑ | ↑ | 250 | 1.68 | 38 | 1.7 |
| 4 | 0.005 | 0 | ↑ | 0 | ↑ | ↑ | 280 | 1.25 | 32 | 1.6 |
| *5 | 0.01 | 0 | ↑ | −0.3 | ↑ | ↑ | 508 | 1.50 | 34 | 2.5 |
| 6 | 0.01 | 0 | ↑ | −0.1 | ↑ | ↑ | 277 | 1.21 | 27 | 1.9 |
| 7 | 0.01 | 0 | ↑ | 0 | ↑ | ↑ | 260 | 1.11 | 26 | 1.8 |
| 8 | 0.01 | 0 | ↑ | 0.1 | ↑ | ↑ | 246 | 1.11 | 26 | 1.7 |
| 9 | 0.01 | 0 | ↑ | 0.2 | ↑ | ↑ | 250 | 1.11 | 27 | 1.6 |
| *10 | 0.01 | 0 | ↑ | 0.4 | ↑ | ↑ | 512 | 1.14 | 30 | 2.3 |
| 11 | 0.03 | 0 | ↑ | 0 | ↑ | ↑ | 400 | 1.10 | 24 | 1.7 |
| 12 | 0.05 | 0 | ↑ | 0 | ↑ | ↑ | 410 | 1.08 | 23 | 1.9 |
| 13 | 0.07 | 0 | ↑ | 0 | ↑ | ↑ | 450 | 1.10 | 24 | 1.8 |
| 14 | 0.09 | 0 | ↑ | 0 | ↑ | ↑ | 440 | 1.22 | 28 | 1.9 |
| 15 | 0.10 | 0 | ↑ | 0 | ↑ | ↑ | 470 | 1.28 | 31 | 2.1 |
| *16 | 0.11 | 0 | ↑ | 0 | ↑ | ↑ | 505 | 2.55 | 52 | 7.5 |
| *17 | 0.15 | 0 | ↑ | 0 | ↑ | ↑ | 670 | 3.05 | 58 | 8.5 |
| 18 | 0.02 | 0 | 0.4 | 0 | ↑ | ↑ | 400 | 1.11 | 26 | 1.7 |
| 19 | ↑ | 0.2 | ↑ | 0 | Ca | ↑ | 390 | 1.11 | 23 | 1.6 |
| 20 | ↑ | 0.4 | ↑ | 0 | ↑ | ↑ | 380 | 1.09 | 23 | 1.5 |
| *21 | ↑ | 0.6 | ↑ | −0.3 | ↑ | ↑ | 502 | 1.45 | 40 | 2.7 |
| 22 | ↑ | 0.6 | ↑ | −0.1 | ↑ | ↑ | 395 | 1.28 | 35 | 1.5 |
| 23 | ↑ | 0.6 | ↑ | 0 | ↑ | ↑ | 370 | 1.15 | 30 | 1.3 |
| 24 | ↑ | 0.6 | ↑ | 0.1 | ↑ | ↑ | 351 | 1.12 | 30 | 1.2 |
| 25 | ↑ | 0.6 | ↑ | 0.2 | ↑ | ↑ | 360 | 1.12 | 32 | 1.2 |
| *26 | ↑ | 0.6 | ↑ | 0.4 | ↑ | ↑ | 520 | 1.15 | 36 | 2.1 |
| 27 | ↑ | 0.8 | ↑ | 0 | ↑ | ↑ | 360 | 1.18 | 42 | 1.2 |
| *28 | ↑ | 1.0 | ↑ | 0 | ↑ | ↑ | 350 | 1.20 | 110 | 1.7 |
| 29 | 0.04 | 0 | 0.1 | 0 | None | ↑ | 400 | 1.12 | 26 | 1.9 |
| 30 | ↑ | 0.2 | 0.1 | 0 | Ba | ↑ | 372 | 1.10 | 30 | 1.6 |
| *31 | ↑ | 0.4 | 0.1 | −0.3 | ↑ | ↑ | 514 | 1.55 | 40 | 2.6 |
| 32 | ↑ | 0.4 | 0.1 | −0.1 | ↑ | ↑ | 380 | 1.23 | 36 | 1.7 |
| 33 | ↑ | 0.4 | 0.1 | 0 | ↑ | ↑ | 365 | 1.08 | 33 | 1.5 |
| 34 | ↑ | 0.4 | 0.1 | 0.1 | ↑ | ↑ | 350 | 1.10 | 31 | 1.5 |
| 35 | ↑ | 0.4 | 0.1 | 0.2 | ↑ | ↑ | 358 | 1.11 | 33 | 1.6 |
| *36 | ↑ | 0.4 | 0.1 | 0.4 | ↑ | ↑ | 526 | 1.20 | 37 | 2.2 |
| 37 | ↑ | 0.6 | 0.1 | 0 | ↑ | ↑ | 360 | 1.13 | 44 | 1.6 |
| 38 | ↑ | 0.8 | 0.1 | 0 | ↑ | ↑ | 350 | 1.13 | 48 | 1.9 |
| *39 | ↑ | 1.0 | 0.1 | 0 | ↑ | ↑ | 330 | 1.40 | 116 | 6.8 |
| 40 | 0.05 | 0.2 | 0 | 0 | Ca | ↑ | 382 | 1.11 | 28 | 1.2 |
| 41 | ↑ | ↑ | 0.2 | 0 | ↑ | ↑ | 360 | 1.14 | 28 | 1.2 |
| 42 | ↑ | ↑ | 0.4 | 0 | ↑ | ↑ | 310 | 1.13 | 29 | 1.3 |
| 43 | ↑ | ↑ | 0.6 | 0 | ↑ | ↑ | 250 | 1.28 | 32 | 1.4 |
| 44 | ↑ | ↑ | 0.8 | 0 | ↑ | ↑ | 240 | 1.35 | 36 | 1.4 |
| *45 | ↑ | ↑ | 1 | 0 | ↑ | ↑ | 220 | 3.20 | 37 | 1.5 |
| 46 | 0.03 | 0.5 | 0.4 | 0 | Ca | ↑ | 395 | 1.09 | 26 | 1.1 |
| 47 | ↑ | ↑ | 0.4 | 0 | 0.8Ca + 0.2Ba | ↑ | 365 | 1.08 | 26 | 1.1 |
| 48 | ↑ | ↑ | 0.4 | 0 | 0.6Ca + 0.4Ba | ↑ | 325 | 1.08 | 32 | 1.2 |
| 49 | ↑ | ↑ | 0.4 | 0 | 0.4Ca + 0.6Ba | ↑ | 310 | 1.09 | 42 | 1.4 |
| 50 | ↑ | ↑ | 0.4 | 0 | 0.2Ca + 0.8Ba | ↑ | 270 | 1.10 | 48 | 1.6 |
| 51 | ↑ | ↑ | 0.4 | 0 | Ba | ↑ | 250 | 1.11 | 49 | 1.8 |
| 52 | 0.04 | 0.6 | 0.5 | 0 | Ca | ↑ | 265 | 1.12 | 27 | 1.5 |
| 53 | ↑ | ↑ | 0.5 | 0 | ↑ | 0.0001 | 265 | 1.11 | 27 | 1.4 |
| 54 | ↑ | ↑ | 0.5 | 0 | ↑ | 0.0003 | 260 | 1.10 | 30 | 1.1 |

TABLE 3-continued

| | Composition of sample | | | | | | Electrical properties | | | Microscopic structure |
|---|---|---|---|---|---|---|---|---|---|---|
| | Composition ratio | | | | | Second sub-component | Varistor voltage | | Dielectric | Crystal grain diameter |
| Sample No. | x mol | y mol | z mol | a mol | M | $Al_2O_3$ mol | $V_{1\,mA}$/mm (V) | Non-linearity $\alpha$ ($V_{1\,mA}/V_{10\,\mu A}$) | Constant $e_r$ | $D_g$ (μm) μm |
| 55 | ↑ | ↑ | 0.5 | 0 | ↑ | 0.001 | 250 | 1.10 | 32 | 0.98 |
| 56 | ↑ | ↑ | 0.5 | 0 | ↑ | 0.003 | 242 | 1.11 | 43 | 1.01 |
| 57 | ↑ | ↑ | 0.5 | 0 | ↑ | 0.005 | 260 | 1.10 | 151 | 0.99 |
| 58 | ↑ | ↑ | 0.5 | 0 | ↑ | 0.01 | 265 | 1.12 | 198 | 1.00 |

Samples with * are comparative examples and outside the scope of the present invention.

In the following, the reason why the composition range of the voltage non-linear resistor ceramic composition according to the present embodiment is limited is described in detail with reference to Table 3.

In the case where the molar ratio x in $[Sr_{1-y}M_y]_{1-a}[Co_{1-z}Mn_z]_{1+a}O_3$ is smaller than 0.002 mol as in Sample No. 2-1, the properties of a varistor are not provided. Meanwhile, in the case where x is greater than 0.10 mol as in Samples Nos. 2-16 and 2-17, the varistor voltage is high ($V_{1\,mA}$/mm>500 V), the non-linearity is low ($\alpha$>2.0), and the dielectric constant is large ($\epsilon_r$>50). The reasons for this are the same as in the first embodiment. That is, it is appropriate for x to be 0.0005 or greater and 0.10 or smaller.

In addition, it can be seen from the results of Samples Nos. 2-5, 2-21, 2-31, 2-10, 2-26, and 2-36 that an appropriate range of the molar ratio a is also −0.1 or greater and 0.2 or smaller, same as in the first embodiment.

In addition, in Samples Nos. 2-8, 2-9, 2-24, 2-25, 2-34, and 2-35, the molar ratio a in $[Sr_{1-y}M_y]_{1-a}[Co_{1-z}Mn_z]_{1+a}O_3$ is in a range of $0<a\leq0.2$, and $[Co_{1-z}Mn_z]$ in the B site is excessive in the composition in comparison with $[Sr_{1-y}M_y]$ in the A site. In the voltage non-linear resistor having such a composition, the varistor voltage can further be lowered while a small dielectric constant and excellent non-linearity are maintained. The lowering of the varistor voltage leads to a further improvement in the effects of ESD-suppression. These effects are the same as in the first embodiment.

In addition, Samples Nos. 2-19, 2-20, 2-23, 2-27, 2-30, 2-33, 2-37, 2-38, and 2-46 to 2-51 have a composition where Sr in the A site of $[Sr_{1-y}M_y]_{1-a}[Co_{1-z}Mn_z]_{1+a}O_3$ is partially substituted with at least one of Ca and Ba. In the voltage non-linear resistors having such a composition, the varistor voltage can further be lowered while a small dielectric constant and excellent non-linearity are maintained. The lowering of the varistor voltage leads to a further improvement in the effects of ESD-suppression. These effects are also the same as in the first embodiment.

In the case where the molar ratio y of the substituted element is greater than 0.8 as in Samples Nos. 2-28 and 2-39, however, the dielectric constant increases irrelevant of the type of element used, Ba or Ca. Therefore, it is preferable for the composition range to be such that the molar ratio y of the substituted element to be 0.8 or less in order to make $\epsilon_r$ as low as 50 or less.

In the case where the molar ratio y of the substituted element in the A site is 1.0 so that Sr in the A site is completely substituted, the crystal grains tend to grow abnormally. In particular, in the case where Sr is completely substituted with Ba as in Sample No. 2-39, this tendency is significant. Therefore, the average crystal grain diameter $D_g$ also increases. This tendency is also the same as in the first embodiment. Accordingly, it is preferable that y is 0.8 or less, and it is preferable that $D_g$ is 2.0 μm or less.

In addition, Samples Nos. 2-41 to 2-45 have a composition where Co in the B site is partially substituted with Mn. This composition allows the varistor voltage to further lower while maintaining a small dielectric constant and excellent non-linearity. The further lowering of the varistor voltage leads to a further improvement in the effects of ESD-suppression. However, in the case where the molar ratio z of the substituted Mn in the B site is greater than 0.8 as in Sample No. 2-45, the non-linearity is low and the sample is not appropriate for practical use. Therefore, it is preferable that the molar ratio z of the substituted Mn in the B site is 0.8 or less in order that a of a non-linearity is 2.0 or less. An appropriate range of z is 0 or more and 0.8 or less, taking the composition in the first embodiment into consideration.

Because of the above-described reasons, it is preferable that the composition of the voltage non-linear resistors for high frequency transmission is a composition exhibiting such properties that $V_{1\,mA}$/mm is 500 V or less, $\alpha$ is 2.0 or less, and $\epsilon_r$ is 50 or less. In other words, compositions that allow for a very low varistor voltage, excellent non-linearity, and an extremely small dielectric constant are preferable. That is, appropriate composition is such that the composition has ZnO as a main component where M is at least one of Ca and Ba, x is 0.0005 mol or greater and 0.10 mol or smaller, the molar ratio y of the substituted M in the A site is 0.8 or less, the molar ratio z of Mn is 0.8 or less, and a is −0.1 mol or greater and 0.2 mol or smaller when represented by the general formula $(1-x)ZnO+x[Sr_{1-y}M_y]_{1-a}[Co_{1-z}Mn_z]_{1+a}O_3$.

Furthermore, a composition to which an extremely small amount of $Al_2O_3$ is added as a second sub-component as in Samples Nos. 2-53 to 2-58 is effective in making crystal grains smaller and further uniform. Therefore, non-linearity and reliability performance against ESD can further be improved, and thus, the reliability is increased. In addition, when the grains in the ceramic structure are microscopic and uniform, the mechanical strength is naturally high, and therefore, there is high reliability against thermal impact and the mechanical impact when the apparatus is dropped. These effects are the same as in the first embodiment. However, in the case where the amount of the additives is great as in Samples Nos. 2-57 and 2-58, the dielectric constant is large. Therefore, it is preferable that the amount of $Al_2O_3$ added to the main composition of 1 mol is in a composition range exceeding 0 mol and being 0.003 mol or less in order to make $\epsilon_r$ 50 or less.

When the above-described voltage non-linear resistor ceramic composition is analyzed through composition analysis and x-ray diffraction, it is found that this composition has a solid solution phase of $[Sr_{1-y}M_y]_{1-a}[Co_{1-z}Mn_z]_{1+a}O_3$ having a perovskite structure in the grain boundaries between ZnO grains in addition to a crystal phase of ZnO. As a result, it can be confirmed that a perovskite type $[Sr_{1-y}M_y]_{1-a}[Co_{1-z}Mn_z]_{1+a}O_3$ compound in the interfaces between ZnO grains works as a substance having varistor properties. Accordingly, as in the first embodiment, the properties become the same when the perovskite type $[Sr_{1-y}M_y]_{1-a}[Co_{1-z}Mn_z]_{1+a}O_3$ compound, which is synthesized in advance, is added to ZnO. As is clear from the above, ZnO that contains a perovskite type $[Sr_{1-y}M_y]_{1-a}[Co_{1-z}Mn_z]_{1+a}O_3$ compound in the above-described composition range has the above-described excellent properties.

As described above, the voltage non-linear resistor ceramic composition according to the present embodiment has ZnO as a main component. In addition, it contains $[Sr_{1-y}M_y]_{1-a}[Co_{1-z}Mn_z]_{1+a}O_3$ where M is at least one of Ca and Ba. $[Sr_{1-y}M_y]_{1-a}[Co_{1-z}Mn_z]_{1+a}O_3$ allows an acceptor level to be provided in the interfaces between ZnO grains in an N type semiconductor and becomes the origin to make the N type semiconductor to have properties of interfacial barrier (varistor properties) in a polycrystal structure. In this respect, it functions in the same manner as conventional Bi oxides and Pr oxides. However, the height of the barrier $V_{gh}$ per grain boundary as found from the varistor voltage $V_{1\,mA}$/mm and the average crystal diameter $D_g$ of the sample according to the present embodiment is 0.4 eV to 0.6 eV, as in the first embodiment. That is, material properties having a low value can be obtained in comparison with conventional compositions, which generally have 0.6 eV to 1.0 eV (Pr-based compositions) or 0.8 eV to 1.4 eV (Bi-based compositions). The varistor voltage is a product of the number N of grain boundaries and $V_{gh}$ in the design of a varistor product as an electronic part for ESD protection. Accordingly, $V_{gh}$ means that it is essentially advantageous to lower the voltage.

In addition, the Bi oxide in the Bi-based varistor has such properties that the state changes in various ways (conversion to liquid phase or phase transition) at temperatures of approximately 600° C. or higher. This leads to changes in properties and thermal destruction due to the thermal energy generated as a result of ESD and causes the properties of the element to deteriorate. In contrast, the melting point of $[Sr_{1-y}M_y]_{1-a}[Co_{1-z}Mn_z]_{1+a}O_3$, where M is at least one of Ca and Ba, is 1500° C. or higher as in the first embodiment, and the composition according to the present embodiment is thermally stable. Therefore, the perovskite type oxide can be used as a substance having voltage non-linear resistor properties, and thus, a voltage non-linear resistor having excellent reliability performance against ESD can be obtained.

In addition, the component elements of the perovskite type oxide are lighter than Pr, and therefore, the dielectric constant of the crystal is generally smaller. Therefore, in the case where the depletion layer region in the grain boundaries is the same, the dielectric constant is essentially smaller. Accordingly, in the case where the perovskite type oxide is used so that the properties become desirable, the dielectric constant is small in grain boundaries, and therefore, it is possible that the capacitance is small in the voltage non-linear resistor element. As described above, it is preferable that the voltage non-linear resistor ceramic composition is free from Bi and Pr.

Next, the properties of a multilayer varistor fabricated using the above-described voltage non-linear resistor ceramic composition are described in detail.

First, sixteen compositions of Samples Nos. 2-2, 2-7, 2-8, 2-11, 2-15, 2-16, 2-19, 2-23, 2-24, 2-33, 2-34, 2-39, 2-45, 2-49, 2-52, and 2-55, are selected from Table 3 as voltage non-linear resistor ceramic compositions for fabricating multilayer varistors. The sixteen material powders having composition ratios of the respective sample numbers are prepared. In the following, the multilayer varistors are fabricated in the same manner as in the first embodiment. The electrical properties of these sixteen multilayer varistors are evaluated in the same manner as in the first embodiment. Table 4 shows the results together with the sample numbers of the compositions used therefor. In the following description, Sample No. 101 in Table 4 is referred to as Sample No.2-101. This is the same for Samples No. 102 to 116.

TABLE 4

| Sample No. | Composition | Electrical properties | | | |
| --- | --- | --- | --- | --- | --- |
| | | Varistor voltage $V_{1\,mA}$ (V) | Non-linearity $\alpha$ ($V_{1\,mA}/V_{10\,\mu A}$) | Capacitance (pF) | Reliability performance against ESD $\Delta V_{1\,mA}$ (%) |
| *101 | Sample No. 2 | 23.0 | 4.45 | 1.85 | −53.6 |
| 102 | Sample No. 7 | 27.2 | 1.12 | 0.95 | −17.4 |
| 103 | Sample No. 8 | 25.6 | 1.11 | 0.94 | −15.3 |
| 104 | Sample No. 11 | 39.5 | 1.13 | 0.71 | −16.5 |
| 105 | Sample No. 15 | 43.8 | 1.30 | 1.11 | −18.2 |
| *106 | Sample No. 16 | 48.5 | 2.75 | 1.44 | −63.8 |
| 107 | Sample No. 19 | 32.1 | 1.09 | 0.68 | −15.6 |
| 108 | Sample No. 23 | 30.1 | 1.13 | 0.98 | −12.2 |
| 109 | Sample No. 24 | 27.8 | 1.12 | 0.97 | −11.5 |
| 110 | Sample No. 33 | 29.0 | 1.11 | 1.02 | −22.2 |
| 111 | Sample No. 34 | 28.4 | 1.07 | 0.99 | −20.5 |
| *112 | Sample No. 39 | 27.5 | 1.12 | 3.36 | −65.6 |
| *113 | Sample No. 45 | 24.0 | 3.35 | 1.07 | −50.2 |
| 114 | Sample No. 49 | 30.2 | 1.13 | 1.23 | −23.5 |
| 115 | Sample No. 52 | 25.6 | 1.14 | 0.62 | −24.7 |
| 116 | Sample No. 55 | 25.1 | 1.15 | 0.56 | −20.3 |

Samples with * are comparative examples and outside the scope of the present invention.

As is clear from the evaluation results in Table 4, Sample No. 2-101 (composition of Sample No. 2-2) has low linearity and a large capacitance. In addition, Sample No. 2-106 (composition of Sample No. 2-16) has low linearity and a high varistor voltage. Sample No. 2-112 (composition of Sample No. 2-39) has a capacitance of 3 pF or larger. Furthermore, Sample No. 2-113 (composition of Sample No. 2-45) has low linearity. None of these satisfies the electrical properties for obtaining a varistor having excellent non-linearity, a low varistor voltage, and a low capacitance. In addition, as for the reliability performance against ESD, they all have a change rate $\Delta V_{1\,mA}$ of −50% or greater, and thus, do not have properties appropriate for practical use.

Meanwhile, multilayer varistors of Samples Nos. 2-102 to 2-105, 2-107 to 2-111, and 2-114 to 2-116 all have a varistor voltage $V_{1\,mA}$ of 25 V to 44 V, non-linearity $\alpha$ of 1.3 or less, and a capacitance of 0.6 pF to 1.2 pF. As described above, the samples have well-balanced electrical properties in comparison with the multilayer varistors of the above-described sample numbers, and thus, have excellent electrical properties for a varistor having a low varistor voltage and a small capacitance. In addition, they all have a change rate $\Delta V_{1\,mA}$ as small as approximately −25% or less, and thus, have excellent reliability performance against ESD. The electrical properties are a low varistor voltage and a small capacitance value in the property region that cannot be obtained in conventional Pr-based and Bi-based compositions, in addition to excellent reliability performance against ESD. The excellent reliability performance against ESD can be obtained because the varistor layers have structures having excellent thermal stability in the grain boundaries, and in addition, a polycrystal body where the microscopic structure is uniform.

Third Embodiment

A voltage non-linear resistor ceramic composition according to a third embodiment of the present invention has ZnO as a main component and contains a perovskite component represented by $[Sr_{1-y}M_y]_{1-a}[Co_{1-z}Cr_z]_{1+a}O_3$. M is at least one of Ca and Ba, x, y, z, and a indicate molar ratios, and $0.0005 \leq x \leq 0.10$, $0 \leq y \leq 0.8$, $0 < z \leq 0.8$, and $-0.1 \leq a \leq 0.2$ are satisfied. That is, the voltage non-linear resistor ceramic composition according to the present embodiment is a composition that is represented by the general formula $(1-x)ZnO+x[Sr_{1-y}M_y]_{1-a}[Co_{1-z}Cr_z]_{1+a}O_3$. In other words, the voltage non-linear resistor ceramic composition according to the present embodiment contains a perovskite component where Co is partially substituted with Cr in the first embodiment.

In the following, specific examples of the voltage non-linear resistor ceramic composition according to the present embodiment are described in detail. First, as starting materials, highly chemically pure powders of ZnO, which is a main component, $SrCO_3$, $Co_2O_3$, $CaCO_3$, and $BaCO_3$, which are sub-components, and $Al_2O_3$, which is a second sub-component, are prepared. In addition, a highly pure powder of $Cr_2O_3$ is also prepared. Then, a voltage non-linear resistor ceramic composition is fabricated through the same procedure as in the first embodiment except that the composition after sintering becomes the composition $(1-x)ZnO+x[Sr_{1-y}M_y]_{1-a}[Co_{1-z}Cr_z]_{1+a}O_3$ shown in Table 5. Table 5 also shows the results of evaluation of these electrical properties in the same manner as in the first embodiment. In the following description, Sample No. 1 in Table 5 is referred to as Sample No. 3-1. This is the same for Samples No.2 to 58.

TABLE 5

| | Composition of sample | | | | | Second sub-component | Electrical properties | | | Microscopic structure Crystal grain diameter |
|---|---|---|---|---|---|---|---|---|---|---|
| | Composition ratio | | | | | | Varistor voltage | Non-linearity | Dielectric | |
| Sample No. | x mol | y mol | z mol | a mol | M mol | $Al_2O_3$ mol | $V_{1mA}$/mm (V) | $\alpha$ ($V_{1mA}/V_{10\mu A}$) | Constant $e_r$ | $D_g$ (µm) µm |
| *1 | 0 | 0 | 0.2 | 0 | None | None | 0.01 | — | — | 2.0 |
| *2 | 0.0002 | 0 | ↑ | 0 | ↑ | ↑ | 210 | 3.45 | 58 | 1.8 |
| 3 | 0.0005 | 0 | ↑ | 0 | ↑ | ↑ | 250 | 1.62 | 42 | 1.8 |
| 4 | 0.005 | 0 | ↑ | 0 | ↑ | ↑ | 275 | 1.22 | 35 | 1.7 |
| *5 | 0.01 | 0 | ↑ | −0.3 | ↑ | ↑ | 511 | 1.50 | 38 | 2.7 |
| 6 | 0.01 | 0 | ↑ | −0.1 | ↑ | ↑ | 285 | 1.20 | 30 | 1.9 |
| 7 | 0.01 | 0 | ↑ | 0 | ↑ | ↑ | 268 | 1.11 | 29 | 1.8 |
| 8 | 0.01 | 0 | ↑ | 0.1 | ↑ | ↑ | 252 | 1.10 | 28 | 1.7 |
| 9 | 0.01 | 0 | ↑ | 0.2 | ↑ | ↑ | 265 | 1.15 | 28 | 1.6 |
| *10 | 0.01 | 0 | ↑ | 0.4 | ↑ | ↑ | 520 | 1.22 | 32 | 2.5 |
| 11 | 0.03 | 0 | ↑ | 0 | ↑ | ↑ | 400 | 1.11 | 27 | 1.8 |
| 12 | 0.05 | 0 | ↑ | 0 | ↑ | ↑ | 405 | 1.09 | 26 | 1.8 |
| 13 | 0.07 | 0 | ↑ | 0 | ↑ | ↑ | 440 | 1.11 | 27 | 1.7 |
| 14 | 0.09 | 0 | ↑ | 0 | ↑ | ↑ | 430 | 1.21 | 32 | 1.8 |
| 15 | 0.10 | 0 | ↑ | 0 | ↑ | ↑ | 460 | 1.26 | 35 | 2.1 |
| *16 | 0.11 | 0 | ↑ | 0 | ↑ | ↑ | 510 | 2.62 | 57 | 7.9 |
| *17 | 0.15 | 0 | ↑ | 0 | ↑ | ↑ | 660 | 3.11 | 62 | 8.3 |
| 18 | 0.02 | 0 | 0.4 | 0 | ↑ | ↑ | 400 | 1.10 | 29 | 1.6 |
| 19 | ↑ | 0.2 | ↑ | 0 | Ca | ↑ | 395 | 1.10 | 27 | 1.6 |
| 20 | ↑ | 0.4 | ↑ | 0 | ↑ | ↑ | 380 | 1.09 | 26 | 1.5 |
| *21 | ↑ | 0.6 | ↑ | −0.3 | ↑ | ↑ | 515 | 1.46 | 39 | 2.8 |
| 22 | ↑ | 0.6 | ↑ | −0.1 | ↑ | ↑ | 384 | 1.25 | 30 | 1.6 |
| 23 | ↑ | 0.6 | ↑ | 0 | ↑ | ↑ | 360 | 1.12 | 25 | 1.4 |
| 24 | ↑ | 0.6 | ↑ | 0.1 | ↑ | ↑ | 342 | 1.11 | 24 | 1.3 |
| 25 | ↑ | 0.6 | ↑ | 0.2 | ↑ | ↑ | 356 | 1.10 | 27 | 1.3 |
| *26 | ↑ | 0.6 | ↑ | 0.4 | ↑ | ↑ | 522 | 1.13 | 34 | 2.3 |
| 27 | ↑ | 0.8 | ↑ | 0 | ↑ | ↑ | 355 | 1.15 | 49 | 1.3 |
| *28 | ↑ | 1.0 | ↑ | 0 | ↑ | ↑ | 340 | 1.21 | 128 | 1.8 |
| 29 | 0.04 | 0 | 0.1 | 0 | None | ↑ | 405 | 1.13 | 29 | 1.9 |
| 30 | ↑ | 0.2 | 0.1 | 0 | Ba | ↑ | 380 | 1.09 | 34 | 1.5 |
| *31 | ↑ | 0.4 | 0.1 | −0.3 | ↑ | ↑ | 518 | 1.52 | 41 | 2.5 |
| 32 | ↑ | 0.4 | 0.1 | −0.1 | ↑ | ↑ | 387 | 1.21 | 38 | 1.6 |
| 33 | ↑ | 0.4 | 0.1 | 0 | ↑ | ↑ | 370 | 1.08 | 37 | 1.5 |
| 34 | ↑ | 0.4 | 0.1 | 0.1 | ↑ | ↑ | 354 | 1.09 | 34 | 1.5 |
| 35 | ↑ | 0.4 | 0.1 | 0.2 | ↑ | ↑ | 361 | 1.10 | 37 | 1.7 |
| *36 | ↑ | 0.4 | 0.1 | 0.4 | ↑ | ↑ | 528 | 1.23 | 40 | 2.3 |
| 37 | ↑ | 0.6 | 0.1 | 0 | ↑ | ↑ | 360 | 1.12 | 48 | 1.7 |
| 38 | ↑ | 0.8 | 0.1 | 0 | ↑ | ↑ | 355 | 1.13 | 50 | 1.8 |
| *39 | ↑ | 1.0 | 0.1 | 0 | ↑ | ↑ | 340 | 1.41 | 134 | 7.2 |
| 40 | 0.05 | 0.2 | 0 | 0 | Ca | ↑ | 382 | 1.11 | 28 | 1.2 |
| 41 | ↑ | ↑ | 0.2 | 0 | ↑ | ↑ | 370 | 1.12 | 32 | 1.2 |
| 42 | ↑ | ↑ | 0.4 | 0 | ↑ | ↑ | 330 | 1.12 | 34 | 1.4 |
| 43 | ↑ | ↑ | 0.6 | 0 | ↑ | ↑ | 280 | 1.25 | 35 | 1.4 |
| 44 | ↑ | ↑ | 0.8 | 0 | ↑ | ↑ | 265 | 1.36 | 40 | 1.5 |
| *45 | ↑ | ↑ | 1 | 0 | ↑ | ↑ | 230 | 3.35 | 42 | 1.7 |
| 46 | 0.03 | 0.5 | 0.4 | 0 | Ca | ↑ | 400 | 1.09 | 31 | 1.1 |
| 47 | ↑ | ↑ | 0.4 | 0 | 0.8Ca + 0.2Ba | ↑ | 375 | 1.08 | 30 | 1.0 |

TABLE 5-continued

| | Composition of sample | | | | | | Electrical properties | | | Microscopic structure |
|---|---|---|---|---|---|---|---|---|---|---|
| | Composition ratio | | | | | Second sub-component | Varistor voltage | Non-linearity | Dielectric | Crystal grain diameter |
| Sample No. | x mol | y mol | z mol | a mol | M mol | $Al_2O_3$ mol | $V_{1\,mA}$/mm (V) | $\alpha$ ($V_{1\,mA}/V_{10\,\mu A}$) | Constant $\epsilon_r$ | $D_g$ (μm) μm |
| 48 | ↑ | ↑ | 0.4 | 0 | 0.6Ca + 0.4Ba | ↑ | 350 | 1.09 | 34 | 1.2 |
| 49 | ↑ | ↑ | 0.4 | 0 | 0.4Ca + 0.6Ba | ↑ | 335 | 1.09 | 42 | 1.3 |
| 50 | ↑ | ↑ | 0.4 | 0 | 0.2Ca + 0.8Ba | ↑ | 310 | 1.11 | 47 | 1.6 |
| 51 | ↑ | ↑ | 0.4 | 0 | Ba | ↑ | 270 | 1.12 | 49 | 1.9 |
| 52 | 0.04 | 0.6 | 0.5 | 0 | Ca | ↑ | 255 | 1.13 | 31 | 1.5 |
| 53 | ↑ | ↑ | 0.5 | 0 | ↑ | 0.0001 | 260 | 1.11 | 32 | 1.3 |
| 54 | ↑ | ↑ | 0.5 | 0 | ↑ | 0.0003 | 260 | 1.09 | 35 | 1.1 |
| 55 | ↑ | ↑ | 0.5 | 0 | ↑ | 0.001 | 255 | 1.10 | 37 | 0.99 |
| 56 | ↑ | ↑ | 0.5 | 0 | ↑ | 0.003 | 240 | 1.11 | 46 | 1.02 |
| 57 | ↑ | ↑ | 0.5 | 0 | ↑ | 0.005 | 255 | 1.12 | 178 | 0.99 |
| 58 | ↑ | ↑ | 0.5 | 0 | ↑ | 0.01 | 270 | 1.12 | 210 | 1.10 |

Samples with * are comparative examples and outside the scope of the present invention.

In the following, the reason why the composition range of the voltage non-linear resistor ceramic composition according to the present embodiment is limited is described in detail with reference to Table 5.

In the case where the molar ratio x in $[Sr_{1-y}M_y]_{1-a}[Co_{1-z}Cr_z]_{1+a}O_3$ is smaller than 0.0002 mol as in Sample No. 3-1, the properties of a varistor are not provided. Meanwhile, in the case where x is greater than 0.10 mol as in Samples Nos. 3-16 and 3-17, the varistor voltage is high ($V_{1\,mA}$/mm>500 V), the non-linearity is low ($\alpha$>2.0), and the dielectric constant is high ($\epsilon_r$>50). The reasons for this are the same as in the first embodiment. That is, it is appropriate for x to be 0.0005 or greater and 0.10 or smaller.

In addition, it can be seen from the results of Samples Nos. 3-5, 3-21, 3-31, 3-10, 3-26, and 3-36 that an appropriate range of the molar ratio a is also −0.1 or greater and 0.2 or smaller as in the first embodiment.

In addition, in Samples Nos. 3-8, 3-9, 3-24, 3-25, 3-34, and 3-35, the molar ratio a in $[Sr_{1-y}M_y]_{1-a}[Co_{1-z}Cr_z]_{1+a}O_3$ is in a range of 0<a≦0.2, and $[Co_{1-z}Cr_z]$ in the B site is excessive in the composition in comparison with $[Sr_{1-y}M_y]$ in the A site. In the voltage non-linear resistors having such a composition, the varistor voltage can further be lowered while a small dielectric constant and excellent non-linearity are maintained. The lowering of the varistor voltage leads to a further improvement in the effects of ESD-suppression. These effects are the same as in the first embodiment.

In addition, Samples Nos. 3-19, 3-20, 3-23, 3-27, 3-30, 3-33, 3-37, 3-38, and 3-46 to 3-51 have a composition where Sr in the A site of $[Sr_{1-y}M_y]_{1-a}[Co_{1-z}Cr_z]_{1+a}O_3$ is partially substituted with at least one of Ca and Ba. In the voltage non-linear resistors having such a composition, the varistor voltage can further be lowered while a small dielectric constant and excellent non-linearity are maintained. The lowering of the varistor voltage leads to a further improvement in the effects of ESD-suppression. These effects are also the same as in the first embodiment.

In the case where the molar ratio y of the substituted element is greater than 0.8 as in Samples Nos. 3-28 and 3-39, however, the dielectric constant increases irrelevant of the type of element used, Ba or Ca. Therefore, it is preferable that the composition range is such that the molar ratio y of the substituted element to be 0.8 or less in order to make $\epsilon_r$ as low as 50 or less.

In the case where the molar ratio y of the substituted element in the A site is 1.0 so that Sr in the A site is completely substituted, the crystal grains tend to grow abnormally. In particular, in the case where Sr is completely substituted with Ba as in Sample No. 3-39, this tendency is significant. Therefore, the average crystal grain diameter $D_g$ also increases. This tendency is also the same as in the first embodiment. Accordingly, it is preferable that y is 0.8 or less, and it is preferable that $D_g$ is 2.0 μm or less.

In addition, Samples Nos. 3-41 to 3-45 have a composition where Co in the B site is partially substituted with Cr. This composition allows the varistor voltage to further lower while maintaining a small dielectric constant and excellent non-linearity. The further lowering of the varistor voltage leads to a further improvement in the effects of ESD-suppression. However, in the case where the molar ratio z of the substituted Cr in the B site is greater than 0.8 as in Sample No. 3-45, the non-linearity is low and the sample is not appropriate for practical use. Therefore, it is preferable that the molar ratio z of the substituted Cr in the B site is 0.8 or less in order that α of a non-linearity is 2.0 or less. An appropriate range of z is 0 or more and 0.8 or less, taking the composition in the first embodiment into consideration.

Because of the above-described reasons, it is preferable that the composition of the voltage non-linear resistors for high frequency transmission is a composition exhibiting such properties that $V_{1\,mA}$/mm is 500 V or less, α is 2.0 or less, and $\epsilon_r$ is 50 or less. In other words, compositions that allow for a very low varistor voltage, excellent non-linearity and an extremely small dielectric constant are preferable. That is, appropriate composition is such that the composition has ZnO as a main component where M is at least one of Ca and Ba, x is 0.0005 mol or greater and 0.10 mol or smaller, the molar ratio y of the substituted M in the A site is 0.8 or less, the molar ratio z of Cr is 0.8 or less, and a is −0.1 mol or greater and 0.2 mol or smaller when represented by the general formula $(1-x)ZnO+x[Sr_{1-y}M_y]_{1-a}[Co_{1-z}Cr_z]_{1+a}O_3$.

Furthermore, a composition to which an extremely small amount of $Al_2O_3$ is added as a second sub-component as in Samples Nos. 3-53 to 3-58 is effective in making crystal grains smaller and further uniform. Therefore, non-linearity and reliability performance against ESD can further be improved, and thus, the reliability is increased. In addition, when the grains in the ceramic structure are microscopic and uniform, the mechanical strength is naturally high, and therefore, there is high reliability against thermal impact and the mechanical impact when the apparatus is dropped. These effects are the same as in the first embodiment. However, in the case where the amount of the additives is great as in Samples Nos. 3-57 and 3-58, the dielectric constant is large. Therefore, it is preferable that the amount of $Al_2O_3$ added to the main composition of 1 mol is in a composition range exceeding 0 mol and being 0.003 mol or less in order to make $\epsilon_r$ 50 or less.

When the above-described voltage non-linear resistor ceramic composition is analyzed through composition analysis and x-ray diffraction, it is found that this composition has a solid solution phase of $[Sr_{1-y}M_y]_{1-a}[Co_{1-z}Cr_z]_{1+a}O_3$ having a perovskite structure in the grain boundaries between ZnO grains in addition to a crystal phase of ZnO. As a result, it can be confirmed that a perovskite type $[Sr_{1-y}M_y]_{1-a}[Co_{1-z}Cr_z]_{1+a}O_3$ compound in the interfaces between ZnO grains works as a substance having varistor properties. Accordingly, as in the first embodiment, the properties become the same when the perovskite type $[Sr_{1-y}M_y]_{1-a}[Co_{1-z}Cr_z]_{1+a}O_3$ compound, which is synthesized in advance, is added to ZnO. As is clear from the above, ZnO that contains a perovskite type $[Sr_{1-y}M_y]_{1-a}[Co_{1-z}Cr_z]_{1+a}O_3$ compound in the above-described composition range has the above-described excellent properties.

As described above, the voltage non-linear resistor ceramic composition according to the present embodiment has ZnO as a main component. In addition, it contains $[Sr_{1-y}M_y]_{1-a}[Co_{1-z}Cr_z]_{1+a}O_3$ where M is at least one of Ca and Ba. $[Sr_{1-y}M_y]_{1-a}[Co_{1-z}Cr_z]_{1+a}O_3$ allows an acceptor level to be provided in the interfaces between ZnO grains in an N type semiconductor and becomes the origin to make the N type semiconductor to have properties of interfacial barrier (varistor properties) in a polycrystal structure. In this respect, it functions in the same manner as conventional Bi oxides and Pr oxides. However, the height of the barrier $V_{gh}$ per grain boundary as found from the varistor voltage $V_{1\ mA}$/mm and the average crystal diameter $D_g$ of the sample according to the present embodiment is 0.4 eV to 0.6 eV as in the first embodiment. That is, material properties having a low value can be obtained in comparison with conventional compositions, which generally have 0.6 eV to 1.0 eV (Pr-based compositions) or 0.8 eV to 1.4 eV (Bi-based compositions). The varistor voltage is a product of the number N of grain boundaries and $V_{gh}$ in the design of a varistor product as an electronic part for ESD protection. Accordingly, $V_{gh}$ means that it is essentially advantageous to lower the voltage.

In addition, the Bi oxide in the Bi-based varistor has such properties that the state changes in various ways (conversion to liquid phase or phase transition) at temperatures of approximately 600° C. or higher. This leads to changes in properties and thermal destruction due to the thermal energy generated as a result of ESD and causes the properties of the element to deteriorate. In contrast, the melting point of $[Sr_{1-y}M_y]_{1-a}[Co_{1-z}Cr_z]_{1+a}O_3$, where M is at least one of Ca and Ba, is 1500° C. or higher as in the first embodiment, and the composition according to the present embodiment is thermally stable. Therefore, the perovskite type oxide can be used as a substance having voltage non-linear resistor properties, and thus, a voltage non-linear resistor having excellent reliability performance against ESD can be obtained.

In addition, the component elements of the perovskite type oxide are lighter than Pr, and therefore, the dielectric constant of the crystal is generally smaller. Therefore, in the case where the depletion layer region in the grain boundaries is the same, the dielectric constant is essentially smaller. Accordingly, in the case where the perovskite type oxide is used so that the properties become desirable, the dielectric constant is small in grain boundaries, and therefore, it is possible that the capacitance is small in the voltage non-linear resistor element. As described above, it is preferable that the voltage non-linear resistor ceramic composition is free from Bi and Pr.

Next, the properties of a multilayer varistor fabricated using the above-described voltage non-linear resistor ceramic composition are described in detail.

First, sixteen compositions of Samples Nos. 3-2, 3-7, 3-8, 3-11, 3-15, 3-16, 3-19, 3-23, 3-24, 3-33, 3-34, 3-39, 3-45, 3-49, 3-52, and 3-55, are selected from Table 5 as voltage non-linear resistor ceramic compositions for fabricating multilayer varistors. The sixteen material powders having composition ratios of the respective sample numbers are prepared. In the following, the multilayer varistors are fabricated in the same manner as in the first embodiment. The electrical properties of these sixteen multilayer varistors are evaluated in the same manner as in the first embodiment. Table 6 shows the results together with the sample numbers of the compositions used therefor. In the following description, Sample No. 101 in Table 6 is referred to as Sample No. 3-101. This is the same for Sample No. 102 to 116.

TABLE 6

| Sample No. | Composition | Electrical properties | | | |
|---|---|---|---|---|---|
| | | Varistor voltage $V_{1\ mA}$ (V) | Non-linearity $\alpha$ ($V_{1\ mA}$/$V_{10\ \mu A}$) | Capacitance (pF) | Reliability performance against ESD $\Delta V_{1\ mA}$ (%) |
| *101 | Sample No. 2 | 23.2 | 4.78 | 1.96 | −59.5 |
| 102 | Sample No. 7 | 27.5 | 1.11 | 0.98 | −16.8 |
| 103 | Sample No. 8 | 26.2 | 1.10 | 0.97 | −13.9 |
| 104 | Sample No. 11 | 39.8 | 1.11 | 0.78 | −14.5 |
| 105 | Sample No. 15 | 44.1 | 1.28 | 1.18 | −18.5 |
| *106 | Sample No. 16 | 48.2 | 2.88 | 1.52 | −60.8 |
| 107 | Sample No. 19 | 32.3 | 1.09 | 0.71 | −18.1 |
| 108 | Sample No. 23 | 30.5 | 1.12 | 1.01 | −13.2 |
| 109 | Sample No. 24 | 28.1 | 1.10 | 1.00 | −12.5 |
| 110 | Sample No. 33 | 28.8 | 1.11 | 1.12 | −22.6 |
| 111 | Sample No. 34 | 28.3 | 1.09 | 1.06 | −20.2 |
| *112 | Sample No. 39 | 27.8 | 1.11 | 3.45 | −68.1 |
| *113 | Sample No. 45 | 23.9 | 3.42 | 1.19 | −52.5 |
| 114 | Sample No. 49 | 31.2 | 1.11 | 1.32 | −24.2 |
| 115 | Sample No. 52 | 24.8 | 1.12 | 0.65 | −24.8 |
| 116 | Sample No. 55 | 25.3 | 1.15 | 0.62 | −20.1 |

Samples with * are comparative examples and outside the scope of the present invention.

As is clear from the evaluation results in Table 6, Sample No. 3-101 (composition of Sample No. 3-2) has low linearity and a large capacitance. In addition, Sample No. 3-106 (composition of Sample No. 3-16) has low linearity and a high varistor voltage. Sample No. 3-112 (composition of Sample No. 3-39) has a capacitance of 3 pF or greater. Furthermore, Sample No. 3-113 (composition of Sample No. 3-45) has low linearity. None of these satisfies the electrical properties for obtaining a varistor having excellent non-linearity, a low varistor voltage, and a low capacitance. In addition, as for the reliability performance against ESD, they all have a change rate $\Delta V_{1\ mA}$ of −50% or greater, and thus, do not have properties appropriate for practical use.

Meanwhile, multilayer varistors of Samples Nos. 3-102 to 3-105, 3-107 to 3-111, and 3-114 to 3-116 all have a varistor voltage $V_{1\ mA}$ of 25 V to 44 V, non-linearity $\alpha$ of 1.3 or less, and a capacitance of 0.6 pF to 1.3 pF. As described above, the samples have well-balanced electrical properties in comparison with the multilayer varistors of the above-described sample numbers, and thus, have excellent electrical properties for a varistor having a low varistor voltage and a small capacitance. In addition, they all have a change rate $\Delta V_{1\,mA}$ as small as approximately −25% or less, and thus, have excellent reliability performance against ESD. The electrical properties are a low varistor voltage and a small capacitance value in the property region that cannot be obtained in conventional Pr-based and Bi-based compositions, in addition to excellent reliability performance against ESD. The excellent reliability performance against ESD can be obtained because the varistor layers have structures having excellent thermal stability in the grain boundaries, and in addition, a polycrystal body where the microscopic structure is uniform.

The above-described voltage non-linear resistor ceramic composition according to the first to third embodiments is generalized such that the voltage non-linear resistor ceramic composition according to the embodiments of the present invention has ZnO as a main component. In addition, a perovskite component that is represented by $[Sr_{1-y}M_y]_{1-a}[Co_{1-z}A_z]_{1+a}O_3$ is contained. That is, when the composition is represented by the general formula $(1-x)ZnO+x[Sr_{1-y}M_y]_{1-a}[Co_{1-z}A_z]_{1+a}O_3$, M is at least one of Ca and Ba, A is Mn or Cr, and x, y, z and a indicate molar ratios: $0.0005 \leq x \leq 0.10$, $0 \leq y \leq 0.8$, $0 \leq z \leq 0.8$, and $-0.1 \leq a \leq 0.2$ are satisfied. Multilayer varistors fabricated using the voltage non-linear resistor ceramic composition have a low varistor voltage, a small capacitance, and a very excellent reliability performance against ESD. Therefore, varistors that are appropriate for ESD protection in various types of electronics can be implemented.

In addition, a dense sintered body can be prepared from the voltage non-linear resistor ceramic composition according to the embodiments of the present invention at a sintering temperature of 1000° C. to 1100° C. Therefore, an Ag—Pd alloy paste which is an inexpensive material for inner layer electrodes can be used, and thus, the cost for manufacture can be reduced.

Generally, varistors can be used without any practical problem in the case where the change rate $\Delta V_{1\,mA}$ in the reliability performance against ESD fluctuates within 30%. Therefore, in the multilayer varistors using the voltage non-linear resistor ceramic composition according to the embodiments of the present invention, it is possible to lower the varistor voltage or make the capacitance smaller within the range that allows for the change rate in the reliability performance against ESD. The varistor voltage can be lowered by reducing the thickness of the varistor layer between inner layer electrodes 2. In contrast, the capacitance can be smaller by increasing the thickness of the varistor layer or reducing the electrode area. In addition, it is also possible to adjust electrical properties such as the varistor voltage and the capacitance depending on the demanded level for withstand voltage against ESD or the application.

The voltage non-linear resistor ceramic composition according to the present invention has excellent electrical properties, such as a low varistor voltage, excellent non-linearity, and an extremely small dielectric constant, and the crystal grains are small and uniform, and thus, excellent reliability performance against ESD can be obtained. The multilayer varistor using the voltage non-linear resistor ceramic composition according to the present invention has a low varistor voltage, a small capacitance, and excellent reliability performance against ESD, and thus, it is particularly useful as a varistor in various types of electronics, which is appropriate for ESD protection.

What is claimed is:

1. A voltage non-linear resistor ceramic composition, comprising:
    ZnO as a main component; and
    a perovskite component represented by $[Sr_{1-y}M_y]_{1-a}[Co_{1-z}A_z]_{1+a}O_3$, wherein
    M is at least one of Ca and Ba, A is Mn or Cr x, y, z and a indicate molar ratios, and $0.0005 \leq x \leq 0.10$, $0 \leq y \leq 0.8$, $0 \leq z \leq 0.8$, and $-0.1 \leq a \leq 0.2$ are satisfied when the composition is represented by a general formula $(1-x)ZnO+x[Sr_{1-y}M_y]_{1-a}[Co_{1-z}A_z]_{1+a}O_3$.

2. The voltage non-linear resistor ceramic composition according to claim 1, wherein
    a is in a range of $0 < a \leq 0.2$.

3. The voltage non-linear resistor ceramic composition according to claim 1, wherein
    there are grain boundaries between grains of the ZnO, and the grain boundaries have a solid solution phase of the perovskite component $[Sr_{1-y}M_y]_{1-a}[Co_{1-z}A_z]_{1+a}O_3$.

4. The voltage non-linear resistor ceramic composition according to claim 1 further containing Al by an amount relative to 1 mol of the composition $(1-x)ZnO+x[Sr_{1-y}M_y]_{1-a}[Co_{1-z}A_z]_{1+a}O_3$ exceeding 0 mol and being less than 0.003 mol when calculated as $Al_2O_3$.

5. The voltage non-linear resistor ceramic composition according to claim 1 wherein
    an average crystal grain diameter of the composition is 2 μm or less.

6. The voltage non-linear resistor ceramic composition according to claim 1, wherein
    the composition is free from Bi and Pr.

7. A multilayer varistor, comprising:
    a ceramic sintered body having a plurality of inner layer electrodes therein; and
    external electrodes each electrically connected to at least one of the inner layer electrodes and formed on a surface of the ceramic sintered body, wherein
    the ceramic sintered body is formed of a voltage non-linear resistor ceramic composition comprising:
    ZnO as a main component and,
    a perovskite component represented by $[Sr_{1-y}M_y]_{1-a}[Co_{1-z}A_z]_{1+a}O_3$, wherein M is at least one of Ca and Ba, A is Mn or Cr x, y, z and a indicate molar ratios, and $0.0005 \leq x \leq 0.10$, $0 \leq y \leq 0.8$, $0 \leq z \leq 0.8$, and $-0.1 \leq a \leq 0.2$ are satisfied when the composition is represented by a general formula $(1-x)ZnO+x[Sr_{1-y}M_y]_{1-a}[Co_{1-z}A_z]_{1+a}O_3$.

8. The multilayer varistor according to claim 7, wherein
    a is in a range of $0 < a \leq 0.2$.

9. The multilayer varistor according to claim 7, wherein
    there are grain boundaries between grains of the ZnO, and the grain boundaries have a solid solution phase of the perovskite component $[Sr_{1-y}M_y]_{1-a}[Co_{1-z}A_z]_{1+a}O_3$.

10. The multilayer varistor according to claim 7 further containing Al by an amount relative to 1 mol of the composition $(1-x)ZnO+x[Sr_{1-y}M_y]_{1-a}[Co_{1-z}A_z]_{1+a}O_3$ exceeding 0 mol and being less than 0.003 mol when Al is calculated as $Al_2O_3$.

11. The multilayer varistor according to claim 7, wherein
    an average crystal grain diameter of the composition is 2 μm or less.

12. The multilayer varistor according to claim 7, wherein
    the composition is free from Bi and Pr.

* * * * *

UNITED STATES PATENT AND TRADEMARK OFFICE
CERTIFICATE OF CORRECTION

| | | |
|---|---|---|
| PATENT NO. | : 7,973,638 B2 | Page 1 of 1 |
| APPLICATION NO. | : 12/401920 | |
| DATED | : July 5, 2011 | |
| INVENTOR(S) | : Eiichi Koga et al. | |

It is certified that error appears in the above-identified patent and that said Letters Patent is hereby corrected as shown below:

In column 24, line 7, please delete "Cr x" and instead insert --Cr.x--

In column 24, line 43, please delete "Cr x" and instead insert --Cr.x--

Signed and Sealed this
Twenty-second Day of November, 2011

David J. Kappos
*Director of the United States Patent and Trademark Office*